(12) United States Patent
McCann et al.

(10) Patent No.: US 8,125,909 B2
(45) Date of Patent: Feb. 28, 2012

(54) METHODS AND APPARATUS FOR CONTROLLING CONGESTION IN A COMMUNICATION NETWORK

(75) Inventors: Peter J. McCann, Naperville, IL (US); Rod N. Averbuch, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 314 days.

(21) Appl. No.: 12/603,874

(22) Filed: Oct. 22, 2009

(65) Prior Publication Data

US 2011/0096665 A1 Apr. 28, 2011

(51) Int. Cl.
*H04L 12/26* (2006.01)
*H04W 72/10* (2009.01)
*H04W 28/10* (2009.01)

(52) U.S. Cl. ........................................................ 370/235
(58) Field of Classification Search .......................... None
See application file for complete search history.

(56) References Cited

U.S. PATENT DOCUMENTS

| | | | |
|---|---|---|---|
| 6,282,429 B1 * | 8/2001 | Baiyor et al. ................. | 455/512 |
| 7,342,880 B2 | 3/2008 | Yanagihara | |
| 2002/0136163 A1 | 9/2002 | Kawakami et al. | |
| 2008/0019277 A1 * | 1/2008 | Schultz et al. ................. | 370/236 |
| 2009/0061799 A1 * | 3/2009 | Park et al. .................... | 455/127.5 |
| 2009/0196210 A1 * | 8/2009 | Desai .............................. | 370/311 |
| 2009/0232001 A1 | 9/2009 | Gong et al. | |
| 2010/0118698 A1 * | 5/2010 | Yokobori et al. ............. | 370/230 |
| 2010/0227636 A1 * | 9/2010 | Kwon et al. ................... | 455/512 |

FOREIGN PATENT DOCUMENTS

WO 0011841 A1 3/2000

OTHER PUBLICATIONS

PCT International Search Report Dated Feb. 8, 2011.
http://en.wikipedia.org/wiki/Carrier_sense_multiple_access_with_collision_avoidance_and_Resolution_using_Priorities.
Communication Relatiing to the Results of the Partial International Search Dated Nov. 24, 2010.

* cited by examiner

*Primary Examiner* — Min Jung
(74) *Attorney, Agent, or Firm* — Valerie M. Davis

(57) ABSTRACT

A subscriber unit: sends a media flow to a correspondent host; receives, from the correspondent host, an indication of a level of congestion in the communication network; compares the level of congestion to a congestion threshold ($TH_1$) during a first time interval, wherein $TH_1$ is determined based on an assigned priority level for the media flow, and terminates the media flow and enters a sleep mode state when, after expiration of the first time interval, the level of congestion exceeds $TH_1$; while in the sleep mode state, the subscriber unit compares a level of congestion in the communication network to a congestion threshold ($TH_2$), and exits the sleep mode state and resumes the media flow when the level of congestion remains below $TH_2$ for the duration of a second time interval.

14 Claims, 3 Drawing Sheets

METHODS AND APPARATUS FOR CONTROLLING CONGESTION IN A COMMUNICATION NETWORK

FIELD OF THE DISCLOSURE

The present disclosure relates generally to a communication network and more particularly to methods and apparatus for controlling congestion in the communication network.

BACKGROUND

With the advent of computer networking today, it is quite easy for several communication devices to communicate via a wired or a wireless network or system. These communication devices communicate with each other using various wired or wireless protocols to exchange data or other media over one or more communication channels in the network. Typically, a communication network has a limited number of communication channels. Also the communication channels usually have a fixed bandwidth and, therefore, can only support a limited amount of media. Thus, communicating an excess amount of media over such limited communication resources results in congestion, which could further spiral into a congestion collapse in the network, which is a phenomenon wherein network bandwidth is consumed with useless retransmissions, and overall utility of the communication channels for completed media transmissions is reduced to zero or nearly zero for all media flows including low and high priority flows as well as real time and non-real time flows.

A known approach to congestion control in a communication network is a transmission control protocol (TCP) approach. This approach attempts to maximize overall channel utility by allocating resources evenly among connections. More particularly, the TCP approach avoids a congestion collapse by employing a cooperative model, wherein transmitting devices detect congestion in the network by measuring end-to-end packet loss rates and decrease their transmission rates accordingly. The cooperative model allows the network to provide at least some network resource utility for TCP traffic flows, which are non-real time flows that have a utility function that is monotonically increasing, concave, equal, and continuous and that can continue to be transmitted even at a reduced rate. However, the TCP approach does not work well for inelastic flows, which have differently-shaped utility functions (namely discontinuous step functions) and which cannot reduce bandwidth below a minimum bandwidth as constrained by physical limitations of the transmitting device such as a codec that is constrained to one or more fixed bit rates. With inelastic flows, if a "fair share" allocation is used, then it is likely that the reduced bandwidth allocation due to congestion in the network will be below the minimum required throughput for most of these flows, and overall utility could many times decrease to zero or nearly zero for this type of traffic.

Accordingly, there is a need for a method of congestion control in a communication network that is also effective for inelastic flows.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
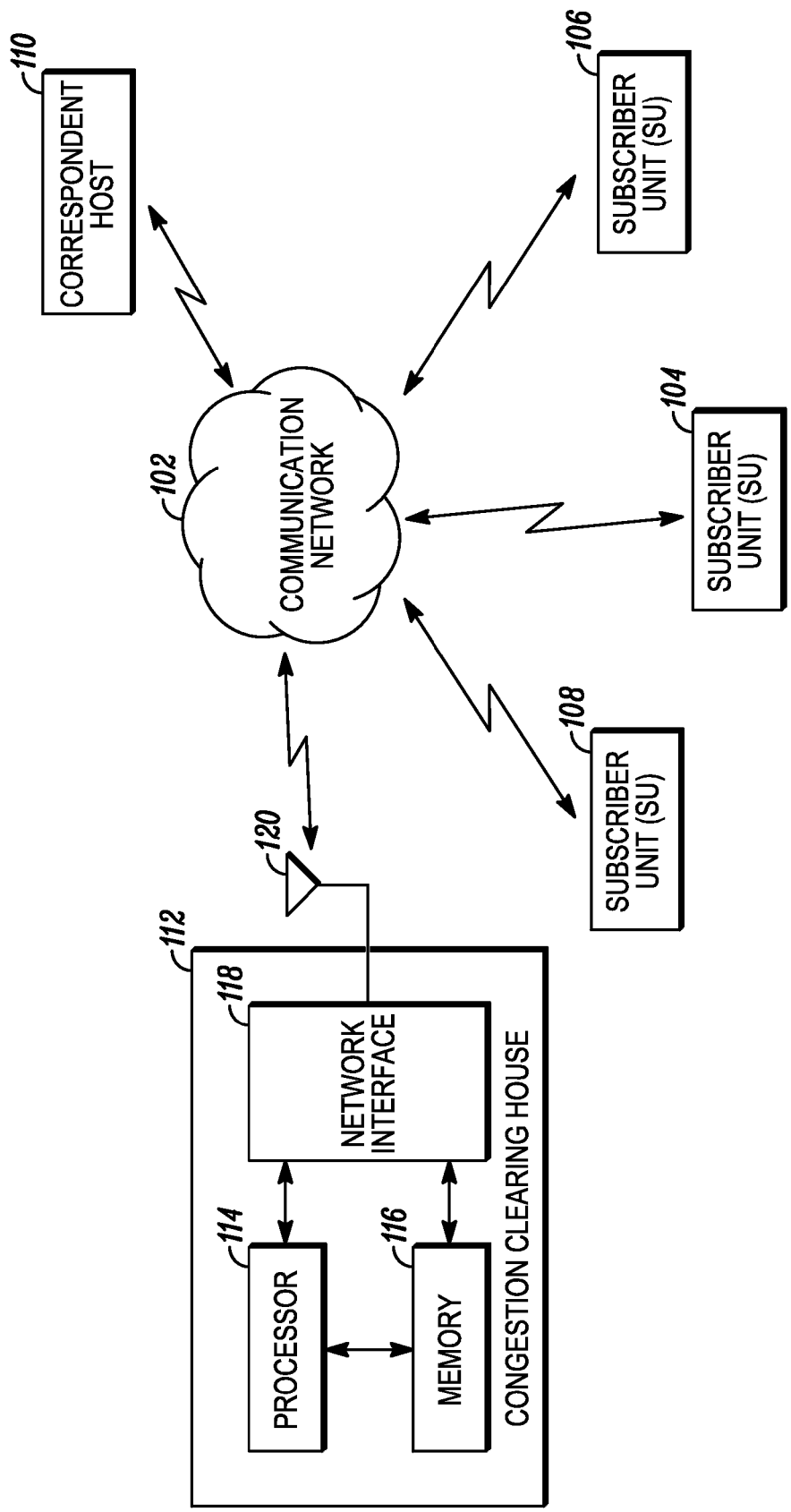
FIG. 1 is a block diagram of a communication system, which implements a method of congestion control in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, a subscriber unit, in a communication network, employs a method of congestion control. More particularly, the subscriber unit: sends a media flow to a correspondent host; receives, from the correspondent host, an indication of a level of congestion in the communication network; compares the level of congestion to a congestion threshold ($TH_1$) during a first time interval, wherein $TH_1$ is determined based on an assigned priority level for the media flow, and terminates the media flow and enters into a sleep mode state when, after expiration of the first time interval, the level of congestion exceeds $TH_1$; while in the sleep mode state, the subscriber unit compares a level of congestion in the communication network to a congestion threshold ($TH_2$) that is also determined based on the assigned priority level for the media flow, and exits the sleep mode state and resumes the media flow when the level of congestion remains below $TH_2$ for the duration of a second time interval, wherein resuming the media flow comprises determining a time to access the network to send the media flow.

Pursuant to another embodiment, a congestion clearinghouse enables congestion control in a communication network. The congestion clearinghouse receives an indication of a level of congestion in the network from a plurality of subscriber units connected to the network, wherein the congestion is determined, for instance, over a number of network paths carrying media flows between the subscriber units in the network. The congestion clearinghouse further receives emergency status and identities associated with each of at least a first portion of the subscriber units and may receive other data such as the network paths themselves (which may be determined by a traceroute) and cryptographic data to authenticate the received data based on credentials of users of the subscriber units. The congestion clearinghouse assigns to each of at least a second portion of the subscriber units one of multiple priority levels, wherein each assigned priority level is based on the received indications, emergency statuses, and identities and is used by the corresponding subscriber unit to determine when to enter into a sleep mode state and terminate sending a media flow and is further used by the corresponding subscriber unit to determine when to exit the sleep mode state and resume sending the media flow, whereby congestion is controlled in the communication network.

Referring now to the drawings, and in particular FIG. 1, a block diagram illustrating a communication system is shown and indicated at 100, which controls congestion in a communication network and provides communication between a plurality of subscriber units. Those skilled in the art will recognize and appreciate that the specifics of the examples in this detailed description are merely illustrative of some embodiments and that the teachings set forth herein are applicable in a variety of alternative settings. Moreover, the system may include more subscriber units, congestion clearinghouses, correspondent hosts, networks or sub-networks, and other entities than what is shown in FIG. 1.

The communications system 100 comprises: a plurality of subscriber units 104, 106, 108, a congestion clearinghouse (referred herein after as "CCH") 112, a correspondent host 110, and a communication network 102. The subscriber units 104-108, the CCH 112, and the correspondent host 110 are all communicatively coupled over the communication network 102, in accordance with the teachings herein. The communication network can be a wired network, a wireless network, or a network enabling both wired and wireless communications and usually includes a number of network infrastructure devices including, but not limited to, bridges, switches, zone controllers, base station controllers, repeaters, base radios, base stations, base transceiver stations, access points, routers or any other type of infrastructure equipment interfacing any entity in a wireless or wired environment.

The subscriber units 104-108 are also referred to in the art as communication devices, client entities, access devices, access terminals, user equipment, mobile stations, mobile subscriber units, mobile devices, and the like, and can be any standard communication device such as radios, mobile phones, Personal Digital Assistants (PDAs), laptops, two-way radios, cell phones, and any other device capable of operating in a wired or wireless environment. Each subscriber unit includes (although not shown) a memory, one or more network interfaces, and a processing device that are operatively coupled.

The network interfaces can be used for, one or more of: sending a media flow to a correspondent host; and as a result of the sending, receiving, from the correspondent host, an indication of a level of congestion in the communication network, in accordance with the teachings herein; and other communications with the CCH, such as receiving a priority level for a media flow, to enable the implementation of methods in accordance with the present teachings.

The implementation of the network interfaces depends on the particular type of network, i.e., wired and/or wireless, to which the communication devices are connected. For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed in the processing device of the subscriber unit through programmed logic such as software applications or firmware stored on the memory device of the subscriber unit.

Besides the above-mentioned functionality, implemented via programmed logic or code, the processing device of each subscriber unit is further programmed with logic or code for implementing methods such as method 200 described below by reference to FIG. 2; and/or the processing device may be implemented as a state machine or ASIC. The memory in the subscriber units can include short-term and/or long-term storage of various data, e.g., congestion level indications, configuration information, priority level, etc., needed for the functioning of the subscriber unit. The memory may further store software or firmware for programming the processing device with the logic or code needed to perform its functionality.

Turning now to the CCH 112. The congestion clearinghouse 112 is a device, such as central server, which includes a memory 116, one or more network interfaces 118 that may or may not be coupled to an antenna 120 (depending on the network interface implementation), and a processing device (or processor) 114 operatively coupled for performing the functionality of the CCH 112. The network interface 118 can be wired, wireless (wherein antenna 120 is used), or a combination of both (examples of which are given above) depending on the particular network to which the CCH 112 is connected. The network interfaces can be used for, one or more of: receiving an indication of a level of congestion in the communication network from a plurality of subscriber units connected to the communication network; receiving emergency status and identities associated with each of at least a portion of the subscriber units, and data regarding network paths over which media flows are being sent in the network, in accordance with the teachings herein; and other communications with the subscriber units and the correspondent host, such as priority levels for media flows, to enable the implementation of methods in accordance with the present teachings.

The memory 116 can include short-term and/or long-term storage of various data, including, but not limited to: the received indication of the level of congestion in the communication network from the plurality of subscriber units connected to the communication network; the received emergency status and identities associated with each of at least the portion of the subscriber units; the received information regarding network paths, and priority levels, in accordance with the teachings herein. The memory may further store software or firmware for programming the processing device with the logic or code needed to perform its functionality.

The processing device 114 may be programmed with logic or code (e.g., software or firmware) to perform its functions; and/or the processing device 114 may be implemented as a state machine or ASIC. Besides the above-mentioned functionality, the processing device of the CCH 112 is further configured for implementing methods such as method 300 described below by reference to FIG. 3.

Further, moving to the correspondent host 110, it may be a subscriber unit, an infrastructure device, or any other end device that may receive a media flow, a pilot signal, or any other communication from the subscriber units 104-108 or the CCH 112. The correspondent host 110 also includes memory (not shown), one or more network interfaces (not shown), and a processing device (not shown) operatively coupled for performing the functionality of the correspondent host 110.

Definitions for some of the terms used herein will assist in understanding the disclosed teachings. For instance, a sleep mode state is defined as a state where the subscriber unit ceases to transmit a media flow and only processes messages that enable a level of congestion in the network to continue to be determined. By contrast, an active state is defined as a state where the subscriber unit communicates (transmits or receives) a media flow and/or communicates (transmits or receives) control signaling to establish a communication link in order to communicate the media flow.

A media flow is defined as comprising communication units (e.g., packets, bursts, and the like) that contain media such as data, voice, or video generated by an application or retrieved from a storage device and that is sent from a transmitting device to a receiving device. An inelastic media flow means a media flow that is associated with a minimum bandwidth needed for transmitting the media flow. An example of an inelastic media flow is a real time media flow, which as that term is used herein, means a media flow that contains media processed in a device substantially (i.e., subject to hardware and software constraints) immediately after being received from a live source such as a camera (video) or a microphone (voice).

A network path is defined as a path that a media flow takes through a communication network between two endpoints. A traceroute is defined as a computer network tool used to determine the network path of a media flow. As used herein, the term traceroute refers to the tool used for Unix-like operating systems as well as variants with similar functionality that include, but are not limited to, tracepath for Linux systems, tracert for Microsoft Windows operating systems, PathPing for Windows NT-based operating systems, etc. A pilot signal is defined as a signal that is sent from a transmitting device to a receiving device and is used for comparison to a known reference signal stored at the receiver and/or at the transmitter. Pilot signals can comprise, for example, tones, symbols, etc., depending on the particular modulation being used.

A priority level is defined as an indication of a level of importance of the transmission of one media flow over the transmission of another media flow, which enables several media flows to be prioritized when the number of media flows to be transmitted in the system exceeds the available communication resources in the network and/or when there is congestion in the network. In other words, if media flow A has a higher priority than media flow B, then the device transmitting media flow A is given access to communication resources before the device transmitting media flow B. An emergency status is defined as an indication of whether a user of a subscriber unit is involved in a situation that poses an immediate risk to health, life, property, or environment. Emergency status can be indicated, for example, based on the type of call, e.g., media flows from a dispatch console or a 911 caller would be given a status of emergency; or can be signaled in the media or control flow; or can be indicated based on the role of a caller at the time of a call, e.g., media flows of emergency response personnel would be allocated a status of emergency. Moreover, a call that fails to indicate an emergency status might be assumed to have a status of non-emergency and handled accordingly.

Congestion or network congestion means that a communication link or path is carrying so much information (media and control signaling) that its quality of service (QOS) deteriorates. Congestion collapse is defined as a condition in the network when little or no useful communication is occurring due to congestion.

Figure 2:
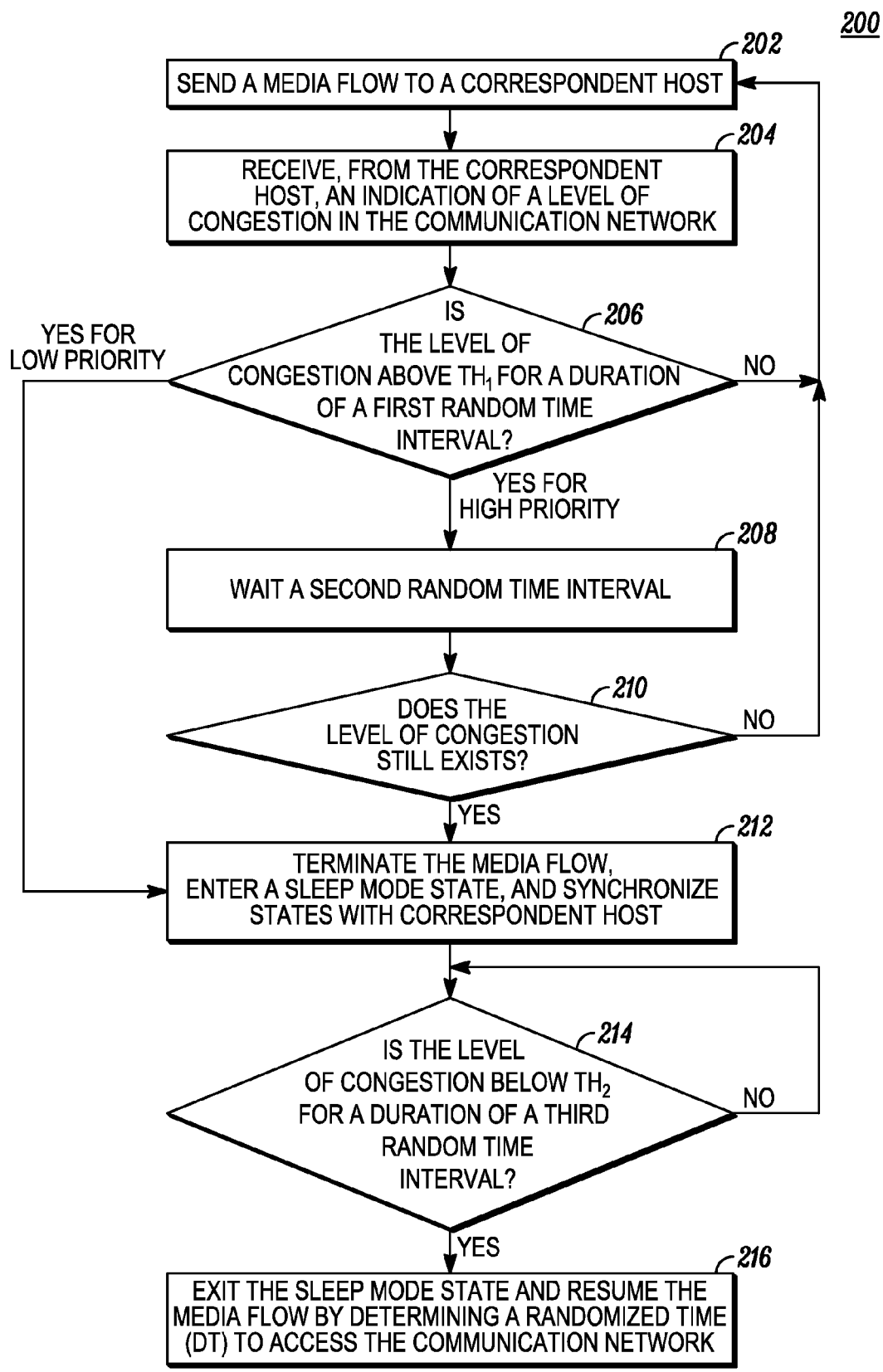
FIG. 2 is a flowchart of a method, at a subscriber unit, for controlling congestion in a communication network in accordance with some embodiments.
Figure 3:
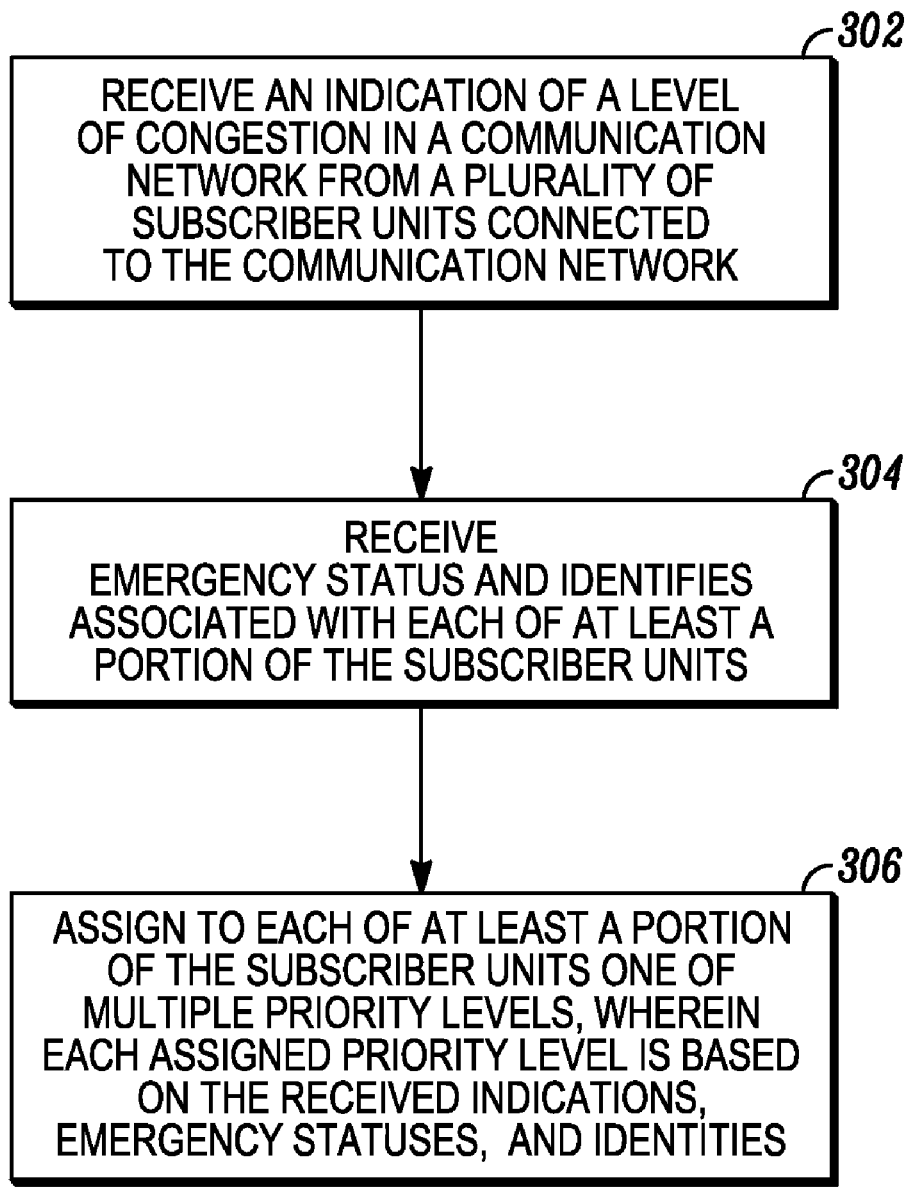
FIG. 3 is a flowchart of a method, at a congestion clearinghouse, to enable congestion control in a communication network in accordance with some embodiments.

Turning now to FIGS. 2 and 3. In FIG. 2, a flow diagram for controlling congestion in a communication network is shown and indicated at 200. A subscriber unit, such as any of the subscriber units 104, 106, or 108 shown in FIG. 1, performs the steps of the method 200. FIG. 3 illustrates a flow diagram of a method 300, implemented in a congestion clearinghouse, to enable congestion control in the communication network. Moreover, with respect to the description herein, functionality illustrated and described by reference to the flow diagrams of FIGS. 2 and 3 can be performed by means of, for example, a processing device (examples of which are given below) programmed with logic or code to perform its functions, wherein the logic is stored as software and/or firmware in a suitable memory device; and/or a processing device implemented as a state machine or ASIC.

Turning first to method 200 shown in FIG. 2; at 202, the subscriber unit is operating in an active mode state and sends a media flow to a correspondent host. In one illustrative implementation, the media flow is an inelastic media flow such as a real time media flow that includes real time media. Examples of real time media include, but are not limited to, voice spoken in real time by a user into a microphone of the subscriber unit and video being shot by a camera on the subscriber unit or being streamed live to the subscriber unit from a camera coupled to the subscriber unit. In accordance with another illustrative implementation, the media flow comprises non-real time media such as video or data stored in a long-term storage device within the subscriber unit or coupled to the subscriber unit, such as media recorded and stored at a media server.

Usually the communication network 102 has a limited number of communication channels, and each communication channel has a limited bandwidth for transmitting media flows. Therefore, as the number of subscriber units sending media flows in the network increases, network congestion may occur. Typical effects of congestion include queuing delay, packet loss and other errors detected in the received media flow at the correspondent host, and blocking of new connections to the network. To enable implementations of the teachings herein, the correspondent host measures and provides an indication of the level of congestion in the network, which is received (204) at the subscriber unit. The correspondent host may use any suitable method for measuring congestion, such as a technique that measures end-to-end congestion, including, but not limited to, a measure of packet loss (e.g., percentage packet loss rate), packet counts, packet delay such as round-trip delay time, jitter, signal-to-noise (S/N) ratio, or other transmission statistics associated with a network path taken by the media flow, which the correspondent host sends to the subscriber unit in a message.

In one illustrative implementation, the message that includes the indication of the level of congestion is an RTCP report, which is one or more messages that includes statistics generated and packaged in compliance with the Real-Time Transport Protocol (RTP) and RTP Control Protocol (RTCP) standards currently published in Internet Engineering Task Force (IETF) Request for Comments (RFC) 3550 (2003). In another example, the indication may be received as one or more negative acknowledgements indicating that the media flow was not properly or completely received by the correspondent host. Based on the indication received from the correspondent host, the subscriber unit determines, computes, or detects the level of congestion in the communication network 102.

In accordance with the teachings herein, as described by reference to the remaining functionality shown in method blocks 206 to 216 of FIG. 2, the subscriber unit uses a combination of congestion thresholds determined based on a priority level for the subscriber unit's media flow and randomized times, random time intervals and/or time windows that can also optionally (depending on the desired robustness of the congestion control mechanism designed for the system) be determined based on the priority level of the subscriber unit's media flow, to enable congestion control in the network. More particularly, the subscriber unit uses the combination of the congestion thresholds and randomized times, random time intervals and/or time windows based on priority level to determine whether to terminate its media flow and enter into a sleep mode state to alleviate congestion in the network or to exit the sleep mode state and resume sending the media flow when congestion in the network has decreased. An illustrative, although not exhaustive, benefit is that the congestion control mechanism in accordance with the instant teachings applies well to both inelastic flows and non-real time flows, unlike the prior art techniques.

The priority level assigned to a media flow is one of multiple priority levels used in the communication network 102. In a very simple example implementation, there are two priority levels, "high" and "low", and media flows allocated a high priority level are given precedence for transmission over media flows allocated a low priority level. This also applies to more than two possible priority levels in the system, wherein media flows allocated a higher priority level are given precedence for transmission over media flows allocated a lower priority level. Media flows having the same priority level have the same priority for access to the communication resources.

Moreover, in one example, priority levels may be determined based on the type of media flow; e.g., an inelastic media flow is prioritized over a non-real time media flow. Priority levels might further be determined based on a user identity, e.g., media flows from first responders or emergency personnel are prioritized over those of all other users. These are example factors or parameters that might be considered in allocating priority levels for media flows in the communication network. However, any algorithm may be used that takes into consideration these parameters and even additional parameters for assigning a priority level (from two or more possible priority levels) to the media flows traversing the communication network, depending on the desired robustness of the congestion control mechanism designed for the system. Some additional illustrative parameters are discussed below by reference to FIG. 3.

In addition, the priority levels assigned to the media flows may be statically configured into the subscriber units, dynamically determined by the subscriber units, provided to the subscriber units by a central server, or some combination. However, dynamically determined priority levels provide an advantage over statically configured ones in that the dynamically configured priority levels take into consideration current conditions in the network. FIG. 3, described below, provides an illustrative embodiment of the congestion clearinghouse 112 dynamically determining and allocating to the subscriber units priority levels for media flows in the communication network 102. Once the subscriber unit knows its associated priority level, it can self determine the congestion threshold values and if applicable the randomized times, random time intervals and/or time windows that depend on the priority level; or these threshold values and times could be sent to the subscriber unit from a central server, statically provisioned in the subscriber unit, or some combination of all three.

For ease of understanding of the principles described herein, two priority levels "high" (denoted by the letter "H" in subscript) and "low" (denoted by the letter "L" in subscript) are used. However, as mentioned above, any number of priority levels may be used depending on the desired robustness of the congestion control mechanism designed for the system. Accordingly, by knowing, detecting, or determining its priority level, congestion thresholds, and any relevant time intervals, time windows, etc., the subscriber unit can continue method 200 illustrated by FIG. 2.

Thus, at 206, the subscriber unit compares the level of congestion received from the correspondent host to a congestion threshold ($TH_1$) during a first time interval. If the level of congestion is below $TH_1$ for the first time interval, the subscriber unit continues to send the media flow over the network. On the other hand, if the level of congestion exceeds $TH_1$ for the first time interval, the subscriber unit terminates (212) the transmission of its media flow and enters into a sleep state. The value of this threshold (and the subsequently described threshold for exiting the sleep mode state) can be determined, for instance, through experimentation or analysis of a given network's overall performance characteristics. Also, as mentioned above, at the very least, $TH_1$ is based on an assigned priority level for the media flow. In this illustrative implementation, $TH_1$ for high priority flows is $TH_{1H}$, and $TH_1$ for low priority flows is $TH_{1L}$; and $TH_{1H}$ is greater than $TH_{1L}$. Thus, in accordance with the teachings herein, even having only the congestion threshold $TH_1$ for terminating the subscriber unit's media flow based on the priority level of the media flow enables some level of congestion control, even where the first time interval is the same for all priority levels. This is because, under some congestion scenarios, the lower congestion threshold $TH_{1L}$ for low priority media flows would cause the subscriber units transmitting these media flows to terminate transmission and enter into the sleep mode state first, thus freeing up bandwidth and reducing congestion in the network for transmission of the high priority media flows. Thereafter, only if the congestion level is high enough that it also exceeded $TH_{1H}$ for the duration of the first time interval, will the subscriber units terminate the high priority media flows and enter into the sleep mode state.

For a more robust implementation, the first time interval is also based on the assigned priority level for the subscriber unit's media flow. This may be accomplished in a number of ways. In one example implementation shown in FIG. 2, the first time interval is chosen from a range that is larger for the high priority media flows than for the low priority media flows. Moreover, the first time interval is randomized or has a random time component that gives a random or pseudo-random distribution of subscriber units' action times in exiting and reentering the network to avoid oscillation. Thus, in this illustrative embodiment, the times and time intervals for entering and exiting the sleep mode state and reentering the network are described as random or randomized, but such randomization is not strictly required to implement the teachings herein. More particularly, the first random time interval is chosen uniformly (randomly or pseudo-randomly) over a range [0 ... $TR_{1L}$] for low priority media flows and [0 ... ($TR_{1H}$+$TR_2$)] or [0 ... ($TR_{1H}$+$TR_2$*priority level)] (may be useful for instance when there are more than two priority levels) for high priority media flows, wherein $TR_{1L}$ may be equal to or less than $TR_{1H}$.

Accordingly, for low priority media flows, if at 206 the level of congestion in the network exceeds $TH_{1L}$ for the duration chosen randomly from a range of [0 ... $TR_{1L}$], then the subscriber unit immediately ceases (212) to transmit its media flow and enters into the sleep mode state. For high priority media flows, if at 206 the level of congestion in the network exceeds $TH_{1H}$ for the duration chosen randomly from a range of [0 ... $TR_{1H}$], then the subscriber unit waits (208) another random time interval $TR_2$; and if (at 210) congestion level has fallen below $TH_{1H}$, the subscriber unit continues to transmit the high priority media flow. Otherwise, if (at 210) the congestion level still exceeds $TH_{1H}$, the subscriber unit terminates (212) the high priority media flow and enters into the sleep mode state. This additional random time interval $TR_2$ enables the freeing up of channel bandwidth via the termination of low priority media flows to facilitate the continued transmission of the high priority media flows. In a simpler but likely less effective implementation, blocks 208 and 210 are absent and $TR_{1L}$, is simply less than $TR_{1H}$ at block 206.

At 214, the subscriber unit synchronizes its state with the correspondent host, so that the correspondent host will also enter inter a sleep mode state whereby the only messages being sent are those that enable the continued measurement of network congestion so that the subscriber unit can determine when to resume transmitting its media flow. While the subscriber unit is in the sleep mode state, the subscriber unit can use any suitable method for measuring congestion, such as a technique that measures end-to-end congestion, including, but not limited to, a measure of packet loss, packet counts, packet delay such as round-trip delay time, jitter, S/N ratio, or other transmission statistics associated with a network path taken by a signal sent between the subscriber unit and the correspondent host. However, since bandwidth has been further limited due to the network congestion, instead of the congestion level being measured based on the media flow being sent between the two devices, the level of congestion is determined based on a lower bandwidth signal sent between the subscriber unit and the correspondent host.

In one illustrative implementation, while in the sleep mode state, the subscriber unit sends only a pilot signal to the correspondent host that is used to determine a level of congestion in the network. The pilot signal is a low bit rate signal having a sufficient enough frequency to enable congestion levels in the network to be measured without further congesting the network. In one example implementation, the correspondent host used the pilot signal to provide an indication to the subscriber unit of the congestion level in the network, by sending such indication in a message such as an RTCP report. In another example implementation, the subscriber unit sends the pilot signal to the correspondent host, which it receives back and uses to determine the level of congestion in the network using any suitable means such as those mentions above.

Upon determining the level of network congestion during the sleep mode state, the subscriber unit compares (214) this level of congestion with a congestion threshold ($TH_2$), which is based on the assigned priority level, during a randomly determined time interval chosen randomly or pseudo-randomly from a range $[0 \ldots TR_3]$. If the level of congestion falls below $TH_2$ for the time duration so chosen, the subscriber unit exits (216) the sleep mode state and resumes transmitting the media flow. Otherwise, the subscriber unit remains in the sleep mode state. The value of $TH_2$ can be the same as that of $TH_1$ or it may be lower than $TH_1$ to ensure that resources are available before the entry of subscriber units back into the communication network. In addition, in this illustrative implementation, $TH_2$ for high priority flows is $TH_{2H}$, and $TH_2$ for low priority flows is $TH_{2L}$; and $TH_{2H}$ is less than $TH_{2L}$ to cause the high priority media flows to have first access to the communication resources.

As with the time interval used by the subscriber units for exiting the network, the time interval used by the subscriber units for reentering the network can be based on priority level to allow high priority flows first access to the freed up bandwidth. In such a case, $TR_3$ for high priority media flows is $TR_{3H}$; $TR_3$ for low priority media flows is $TR_{3L}$, and $TR_{3H}$ is less than $TR_{3L}$. Once the subscriber unit determines to exit the sleep mode state, enter the active mode state, and resume its media flow, the subscriber unit determines a randomized time (DT) to access the communication network during a time window that is determined based on the assigned priority level. The time window may be calculated, for example, by the multiplication of two elements, wherein the first element is a random element to avoid all subscribers with the same priority level attempting to use the network all at once, and the second element is a factor of the priority level. In one embodiment, high priority is represented as a higher number than for low priority, so the second element is the inverse of the priority level which generates a lower number for high priority media flows, thereby enabling these flows first entrance back into the network as the time window for high priority media flows is shorter than for low priority media flows. Thus, when each subscriber unit implements method 200, the congestion is automatically controlled, minimized or avoided in the communication network.

Turning now to FIG. 3, a flow diagram is shown illustrating a method 300, implemented in a CCH, to enable congestion control in the communication network. At 302 and 304, the CCH receives data from the subscriber units in the network to enable the CCH to dynamically assign (306) priority levels to the media flows of at least some of these subscriber units to facilitate congestion control using method 200. In an illustrative embodiment, the CCH receives (302) an indication of a level of congestion in the communication network from a plurality of subscriber units connected to the communication network. For example, the subscriber units that receive an indication of a level of network congestion, e.g., in a RTCP report, from a correspondent host in response to sending a media flow over the network, then forward to the CCH this indication of congestion level, such as by forwarding the RTCP reports or by forwarding the calculated, detected, or determined congestion levels. The CCH may further be provided a network path (e.g., an output of a traceroute containing a list of hops between sending and receiving devices) associated with each level of congestion reported.

The CCH also receives (304) at a minimum emergency status or some type of status of the call (e.g., personal, routine business, emergency, etc.) and identities (e.g., user identity, device identifier, etc.) associated with all of or at least a portion (or subset) of the subscriber units from which the indication of the level of congestion is received. Using the levels of congestion, status information, identifiers, and optionally the network path information, the CCH uses a suitable algorithm designed based on the parameter inputs (e.g., a heuristic analysis) to determine a priority level for each of all or at least some of the subscriber units from which the emergency status and identities are received.

Additional parameters may be considered by the CCH in dynamically determining priority levels for the subscriber units in the communication network. For example, the CCH may further be provided the geographic location of the user, which could determine available throughput in a single cell; some cryptographic data to authenticate the congestion report based in credentials of the user; capacity agreements with public safety agencies and/or Internet Service Providers that support these agencies; etc.

Thus, using this information from a number of subscriber units throughout the network, the CCH has a better ("global") picture of current conditions in the network such as the capacity of links along network paths, known either from configuration or from inference from subscriber unit reports, and the relative emergency status of each subscriber unit, moderated by the identity of the user (e.g., public safety emergencies would take priority over emergencies reported by the general public, which would take priority over non-emergencies) in order to determine priority levels for the subscriber units in the communication network. A further illustrative benefit of using the CCH to dynamically determine priority level is that there is no need to change the routers in the communication network; it does not require that resources be explicitly reserved for particular flows; and its use can be limited to times during which there is congestion. It should be noted that the CCH can be further configured for subsequent updates to its priority levels.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of congestion control in a communication network, the method comprising:
at a subscriber unit:
sending a media flow to a correspondent host;
receiving, from the correspondent host, an indication of a first level of congestion in the communication network;
comparing the first level of congestion to a first congestion threshold during a first time interval, wherein the first congestion threshold is determined based on an assigned priority level for the media flow, and terminating the media flow and entering a sleep mode state when, after expiration of the first time interval, the first level of congestion exceeds the first congestion threshold;
while in the sleep mode state, comparing a second level of congestion in the communication network to a second congestion threshold, wherein the second congestion threshold is determined based on the assigned priority level for the media flow, and exiting the sleep mode state and resuming the media flow when the second level of congestion remains below the second congestion threshold for the duration of a second time interval, wherein resuming the media flow comprises determining a time to access the communication network to send the media flow.

2. The method of claim 1, wherein the time to access the communication network occurs during a time window that is determined based on the assigned priority level.

3. The method of claim 2, wherein the time window being determined based on the assigned priority level comprises the time window being multiplied by the assigned priority level.

4. The method of claim 1, wherein at least one of the time to access, the first time interval or the second time interval is determined based on the assigned priority level for the media flow.

5. The method of claim 1, wherein the assigned priority level for the media flow is dynamically provided by a central server based on inputs from a plurality of subscriber units connected to the communication network, wherein the inputs comprise at least one of identities associated with the subscriber units, geographic locations of the subscriber units, emergency status associated with the subscriber units, network paths for media flows between sending and receiving subscriber units, or an indication of a level of congestion along the network paths.

6. The method of claim 1 further comprising, while in the sleep mode state, the subscriber unit sending only a pilot signal to the correspondent host, which is used by the correspondent host to provide an indication of the second level of congestion.

7. The method of claim 1 further comprising, while in the sleep mode state, the subscriber unit sending only a pilot signal to the correspondent host, which is received back from the correspondent host to determine the second level of congestion.

8. The method of claim 1 further comprising the subscriber unit synchronizing the sleep mode state with the correspondent host.

9. The method of claim 1, wherein the media flow is an inelastic media flow.

10. The method of claim 9, wherein the inelastic media flow is a real time media flow.

11. A method to enable congestion control in a communication network, the method comprising:
at a congestion clearinghouse:
receiving an indication of a level of congestion in the communication network from a plurality of subscriber units connected to the communication network;
receiving emergency status and identities associated with each of at least a first portion of the subscriber units;
assigning to each of at least a second portion of the subscriber units one of multiple priority levels, wherein each assigned priority level is based on the received indications, emergency statuses, and identities and is used by the corresponding subscriber unit to determine when to enter into a sleep mode state and terminate sending a media flow and is further used by the corresponding subscriber unit to determine when to exit the sleep mode state and resume sending the media flow, whereby congestion is controlled in the communication network.

12. The method of claim 11 further comprising the congestion clearinghouse receiving a network path for each of the plurality of the subscriber units, wherein each received indication of a level of congestion corresponds to a different one of the received network paths.

13. The method of claim 12, wherein at least one of the network paths is determined using a traceroute.

14. An apparatus to enable congestion control in a communication network, the apparatus comprising:
a network interface for:
receiving a network path and a corresponding indication of a level of congestion along the network path from a plurality of subscriber units connected to the communication network;
receiving emergency status and identities associated with each of at least a first portion of the subscriber units;
a processor for:
assigning to each of at least a second portion of the subscriber units one of multiple priority levels, wherein each assigned priority level is based on the received indications, emergency statuses, and identities and is used by the corresponding subscriber unit to determine when to enter into a sleep mode state and terminate sending a media flow and is further used by the corresponding subscriber unit to determine when to exit the sleep mode state and resume sending the media flow, whereby congestion is controlled in the communication network.

* * * * *